United States Patent [19]

Muzzio

[11] 4,029,879

[45] June 14, 1977

[54] PROCESS FOR THE REMOVAL OF CATALYSTS FROM POLYETHER POLYOLS EMPLOYING WATER AND ADSORBENT

[75] Inventor: John A. Muzzio, Grosse Ile, Mich.

[73] Assignee: BASF Wyandotte Corporation, Wyandotte, Mich.

[22] Filed: Nov. 17, 1975

[21] Appl. No.: 632,276

[52] U.S. Cl. .............................. 536/4; 260/268 R; 260/568; 260/573; 260/584 C; 260/611 B; 260/613 B; 260/615 B; 536/1; 536/120

[51] Int. Cl.$^2$ ................ C07H 15/08; C07C 41/00; C07C 43/00

[58] Field of Search ....... 260/210 R, 611 B, 613 B, 260/615 B, 568, 584 C, 209 R, 268 R, 573, 704; 536/1, 120, 4

[56] References Cited

UNITED STATES PATENTS

| | | | |
|---|---|---|---|
| 3,528,920 | 9/1970 | Niizeki et al. | 260/615 B |
| 3,715,402 | 2/1973 | Louvar et al. | 260/210 R |
| 3,823,145 | 7/1974 | Louvar et al. | 260/210 R |

Primary Examiner—Johnnie R. Brown
Attorney, Agent, or Firm—Norbert M. Lisicki; Bernhard R. Swick; Robert E. Dunn

[57] ABSTRACT

An improvement in the process of catalyst removal in the preparation of polyether polyols is achieved by adding a critical amount of water from about 1 to about 5 percent by weight based on the weight of polyol to an adsorbent synthetic magnesium silicate-polyol mixture followed by filtration to remove the adsorbent.

7 Claims, No Drawings

PROCESS FOR THE REMOVAL OF CATALYSTS FROM POLYETHER POLYOLS EMPLOYING WATER AND ADSORBENT

BACKGROUND OF THE INVENTION

1. Field of the Invention

Polyoxyalkylene ether polyols, hereinafter for convenience called polyols, are commonly used in the production of urethane polymers. These polyols are reacted with polyisocyanate in the presence of added catalyst and other materials to produce urethane polymers which may be in the form of rubber-like elastomers, flexible or rigid foams and the like. In order that urethane polymers of desired properties and characteristics be produced, it is important that the polyols to be reacted with the polyisocyanate are essentially free of impurities which may function as undesirable catalysts or otherwise in the urethane polymer reaction.

Polyols, as commercially prepared, contain in the crude form various impurities such as alkali metal hydroxide, or other metal salts which were employed as catalysts for the production of polyols. The normal concentrations of catalysts range from 1700 to 4000 parts per million. It is desirable to reduce this to a level of about 5 parts per million or less.

2. Prior Art

Present commercial practices for the removal of these impurities can involve neutralization of the salts of acids forming insoluble salts and removal of same by filtration. Centrifugation, employing mixtures of polyol, water, and solvent can also be employed for the removal of residual catalyst.

The crude polyols without prior neutralization of the catalyst can be treated with a synthetic type adsorbent followed by filtration of the polyol. Present commercial practice involves mixing the polyol and adsorbent with a minimal amount of water present, generally about 0.3 percent. Without controlling the quantity of water present it has been found necessary, on occasion, to interrupt the filtration process and to add more adsorbent to achieve the desired catalyst level. Often the polyol quality suffers because of the great risk of oxidizing the polyols due to repeated interruption in the filtration process necessitating a break in the filter press. This attendant exposure to air causes the production of off-grade polyol by increasing undesirable acidity.

A number of patents disclose the use of various acidic materials for the neutralization of the alkali metal catalyst followed by filtration of the precipitated salts. Among these are U.S. Pat. Nos. 3,833,669; 3,053,903; 2,983,763; 2,448,664; and 3,016,404. U.S. Pat. No. 3,528,920 discloses the use of synthetic magnesium silicate as an adsorbent for the removal of catalyst from the various glycol ethers. However, this patent also discloses that the undesired alkaline catalyst is first neutralized with an acid prior to filtration. None of the prior art recognizes that the amount of water present during the treatment with adsorbent, and the time of addition of that water improves the efficiency of catalyst removal.

SUMMARY OF THE INVENTION

It has been discovered that the process of catalyst removal from polyols can be improved by adding a critical amount of water, 1.0 to 5.0 percent by weight, based on the weight of polyol to the mixture of polyol and adsorbent prior to heating and filtration.

DESCRIPTION OF THE PREFERRED EMBODIMENT

The improved process for the removal of residual catalyst involves the addition of about at least 1 percent adsorbent and 1 percent water to the hot polyol in a suitable vessel and then mixing for at least 1 hour at temperatures ranging from about 80° Centigrade to about 130° Centigrade, followed by filtration. Temperatures appreciably above 130° Centigrade can result in degradation of the polyol especially in the presence of air. This degradation causes the formation of acidic materials which make the polyol unsuitable for use in the production of polyurethane polymers. More preferably, the filtration process temperature ranges from about 90° Centigrade to about 120° Centigrade. After the filtration is complete the polyols are stripped of water and other volatiles at temperatures ranging from about 80° Centigrade to about 130° Centigrade at 1 to 10 millimeters mercury pressure. We have found that the amount of water added during the process and the time of addition of the water are most critical. By employing the present invention it is possible to decrease the cycle time of polyol manufacture by increasing the filtration rate, and decrease the amount of adsorbent employed due to greater efficiency of catalyst removal. It has been found that the most effective amount of water ranges from about 1.0 percent to 5.0 percent based on the weight of polyol to be purified. The amount of water that is added results both in higher efficiency of alkali catalyst removal and also an increased filtration rate as shown below. The addition of water results in greater adsorptivity of the catalyst for a given amount of adsorbent and hence less adsorbent. Additionally, since a smaller amount of adsorbent is employed, the need for large capacity filters is diminished.

In general, the impurities present in the polyol which must be removed are catalysts used in the preparation of the polyol. These catalysts are generally alkali metal hydroxides or alkali metal alkoxides such as sodium hydroxide, potassium hydroxide, sodium alkoxide, potassium alkoxide, and so forth. Additional catalysts which may be employed in the preparation of such polyols and which may be removed by the instant process include the hydroxides and alkoxides of lithium or rubidium and cesium.

Generally speaking, the polyols purified in accordance with the present invention include those polyols prepared by condensing monomeric units such as ethylene oxide, propylene oxide, butylene oxide, and mixtures thereof with active hydrogen compounds such as ethylene glycol, propylene glycol, water, dipropylene glycol, trimethylene glycol, 1,2-butanediol, 1,3-butanediol, 1,4-butanediol, hexanetriol, glycerol, trimethylolpropane, trimethylolethane, hydroquinone, pentaerythritol, alpha-methylglucoside, sorbitol, sucrose, ethylene diamine, diethylene triamine, toluene diamine, aniline, methylene dianiline, piperazine, triisopropanolamine, and bisphenol A wherein these polyols have a molecular weight range from about 300 to about 26,000.

Included are those polyols which are characterized as being essentially hydroxyl terminated polyether polyols which have the general formula

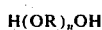

wherein R is an alkylene radical and n is an integer which in a preferred embodiment is sufficiently large that the compound, as a whole, has a molecular weight from about 300 to about 26,000. These would include polyoxyethylene glycol, polyoxypropylene glycol, polyoxybutylene glycol, and polytetramethylene glycol. Other typical polyols include block copolymers, e.g., combination of polyoxypropylene and polyoxyethylene glycols, more specifically those having the general formula:

$$HO(C_2H_4OH)_n(C_3H_6O)_m(C_2H_4O)_nH$$

wherein n and m are together sufficient for attainment of the desired minimum molecular weight, that is, about 300. Also included are copolymers of poly-1,2-oxybutylene and polyoxyethylene glycols and poly-1,4-oxybutylene and polyoxypropylene glycols and random copolymer glycols prepared from blends of sequential addition of two or more alkylene oxides as well as glycols as described above capped with the ethylene oxide units. The polyols purified in accordance with this invention can contain arylene or cycloalkylene radicals together with the alkylene radicals as, for example, in the condensation products of a polyoxyalkylene ether glycol with $\alpha, \alpha'$-dibromo-p-xylene in the presence of a catalyst. In such products the cyclic groups inserted in a polyether chain are preferably phenylene, naphthalene, or cyclohexylene radicals or those radicals containing alkyl or alkylene substituents as in the tolylene, phenylethylene or xylylene radicals.

The adsorbents which can be employed in the practice of this invention are the synthetic magnesium silicate adsorbents. They may be prepared by the reaction of a magnesium salt such as magnesium sulfate with sodium silicate. The resulting products can have particle sizes ranging from 100 to 500 microns with an average particle size of about 325 microns. These adsorbents are sold under trademarks of "BRITE SORB" by Philadelphia Quartz Corporation, and "MAGNESOL" by Reagent Chemicals. The amount of adsorbent which can be employed depends on the concentration of catalyst present in the polyol. Thus, amounts ranging from about 0.5 percent to about 5 percent by weight based on the weight of the polyol may be employed. Preferably, however, the concentration of adsorbent ranges from about 1.0 percent to about 3.0 percent based on the weight of polyol. From an economical point of view it is preferable to use as little as possible of the adsorbent.

The following Examples are provided to further illustrate the invention. Parts and percents are by weight unless otherwise noted. In these Examples the polyols designated by the letters, A, B, etc., are as follows:

Polyol A is a trimethylolpropane-propylene oxide-ethylene oxide adduct having a molecular weight of about 6700 and containing about 15 percent by weight ethylene oxide.

Polyol B is a glycerol-propylene oxide-ethylene oxide adduct having a molecular weight of about 3800 and containing about 11 percent by weight ethylene oxide.

Polyol C is a trimethylolpropane-propylene oxide-ethylene oxide adduct having a molecular weight of about 6300 and containing about 5 percent by weight ethylene oxide.

Polyol D is a polyoxypropylene glycol having a molecular weight of about 400.

Polyol E is a pentaerythritol-propylene oxide adduct having a molecular weight of about 400.

Polyol F is a glycerol-propylene oxide adduct having a molecular weight of about 3000.

Polyol G is an ethylene glycol ethylene oxide-propylene oxide adduct having a molecular weight of about 3000 wherein the oxyethylene content is about 13 percent by weight.

Polyol H is a trimethylolpropane-propylene oxide-ethylene oxide adduct having a molecular weight of about 3800 and containing about 13 percent by weight ethylene oxide.

Polyol I is a trimethylolpropane-propylene oxide-ethylene oxide adduct having a molecular weight of about 4500 and containing about 9 percent by weight ethylene oxide.

Polyol J is a glycerol-propylene glycol-propylene oxide-ethylene oxide adduct having a molecular weight of about 2600 and containing about 9 percent by weight ethylene oxide.

Polyol K is a glycerol-propylene oxide-ethylene oxide adduct having a molecular weight of about 2900 and containing about 11 percent by weight ethylene oxide.

EXAMPLES 1-12

In the Examples of Table I below, 150 grams of the crude polyol were stirred with 1.5 percent synthetic magnesium silicate adsorbent at 98° Centigrade for 1 hour. Varying amounts of water based on the weight of polyol, as indicated below, were then added, followed by further heating with stirring for 2 hours. The mixture was filtered on a Buchner funnel under about 10 millimeters mercury vacuum employing a medium porosity filter paper, Whatman No. 540, 12.5 centimeters diameter. The filtration times were recorded and the residual catalyst concentrations were determined by alkalinity titrations. The results below illustrate that the post addition of water, after heating, at levels of 1 to 5 percent based on the weight of the polyol result both in improved filtration rates and improved catalyst removal.

Table I

| Examples | Polyol | % H$_2$O Added | Filtration Rate cc/min. | K, ppm |
|---|---|---|---|---|
| 1 | A | — | 1.7 | 28 |
| 2 | A | 1.3 | 2.6 | 15 |
| 3 | A | 2.0 | 3.3 | 10 |
| 4 | A | 2.6 | 4.5 | 5 |
| 5 | A | 3.9 | 6.5 | 6 |
| 6 | A | 5.2 | 3.2 | 21 |
| 7 | B | — | 1.2 | 30 |
| 8 | B | 0.7 | 4.1 | 14 |
| 9 | B | 1.3 | 11.0 | 7 |
| 10 | B | 2.6 | 28.6 | 5 |
| 11 | B | 3.9 | 14.3 | 8 |
| 12 | B | 5.3 | 8.4 | 12 |

EXAMPLES 13-31

In the Examples of Table II below, 1000 grams of the designated crude polyol were mixed with 1.5 percent synthetic magnesium silicate adsorbent, the indicated amount of water and then stirred and heated at 100° Centigrade for 1 hour in a 2-liter resin flask. The mixture was filtered through a system composed of a Seitz No. 6 pressure filter fitted with a 1-liter bomb to allow for greater filtration capacity. Forty-five pounds of pressure was applied and the filtration flow measured at various intervals for 1 hour. The temperature of the mixture was maintained at 100° Centigrade by using a heating tape on the bomb and a heat lamp on the filter. The residual catalyst concentration in the polyols was determined by an alkalinity titration. The results obtained indicate that improved filtration rates and catalyst removal are obtained when at least one percent water is added simultaneously to the polyol and adsorbent as compared to the post addition of water.

Table II

| Examples | Polyol | % $H_2O$ Added | Filtration Rate gal/hr/ft$^2$ | K, ppm |
|---|---|---|---|---|
| 13 | A | — | 5 | 23 |
| 14 | A | 2.5* | 12 | 2 |
| 15 | A | 2.5 | 33 | <5 |
| 16 | C | 2.5 | 2.5 | 5 |
| 17 | C | 2.5 | 18 | 2 |
| 18 | D | 0.6 | 90 | 4 |
| 19 | D | 2.5 | 110 | 4 |
| 20 | E | 0.6 | 13 | 14 |
| 21 | E | 2.5 | 18 | 7 |
| 22 | F | — | 20.7 | 53 |
| 23 | F | 2.5 | 20.7 | 10 |
| 24 | D | — | 77.6 | 18 |
| 25 | D | 2.5 | 97 | 6 |
| 26 | G | — | 6.2 | 28 |
| 27 | G | 2.5 | 9.2 | 2 |
| 28 | H | — | 7.2 | 123 |
| 29 | H | 2.5 | 12.5 | 7 |
| 30 | I | — | 10 | 11 |
| 31 | I | 2.5 | 40 | 4 |

*Water was added after the polyol-adsorbent mixture was heated for one hour at 100° Centigrade.

EXAMPLES 32-41

In the Examples of Table III below, the procedure of Examples 13-31 was followed except that the concentration of the adsorbent and the water was varied as indicated. The results indicate the addition of at least 1 percent of water is beneficial in improving both the filtration rate and the catalyst removal.

Table III

| Examples | Polyol | % Adsorbent | % $H_2O$ Added | Filtration Rate gal/hr/ft$^2$ | K, ppm |
|---|---|---|---|---|---|
| 32 | K | 1.0 | — | 42.7 | 300 |
| 33 | K | 1.0 | 1.5 | 201 | 47 |
| 34 | K | 1.0 | 3.0 | 254 | 29 |
| 35 | K | 1.0 | 4.5 | 233 | 16 |
| 36 | K | 1.0 | 5.5 | 210 | 18 |
| 37 | K | 2.5 | — | 22 | 16 |
| 38 | K | 2.5 | 1.5 | 25.6 | 2 |
| 39 | K | 2.5 | 2.5 | 33.5 | 1 |
| 40 | K | 2.5 | 3.5 | 31.8 | 1 |
| 41 | K | 2.5 | 4.5 | 38 | 1 |

EXAMPLES 42-54

In the Examples of Table IV below, the procedure of Examples 32-41 was followed with the additional variation of temperature. The results again illustrate that water addition to the polyol-adsorbent mixture results in improved filtration rates and catalyst removal.

Table IV

| Examples | Polyol | % Adsorbent | % $H_2O$ Added | Temperature ° C. | Filtration Rate gal/hr/ft$^2$ | K, ppm |
|---|---|---|---|---|---|---|
| 42 | J | 1.5 | — | 100 | 29.4 | 21 |
| 43 | J | 1.5 | 2.5 | 100 | 105 | 5 |
| 44 | J | 1.5 | 2.5 | 115 | 124 | 1 |
| 45 | H | 1.5 | — | 115 | 12.6 | 25 |
| 46 | H | 1.5 | 2.5 | 100 | 44 | 4 |
| 47 | H | 1.5 | 2.5 | 130 | 48 | 5 |
| 48 | H | 1.5 | 3.3 | 130 | 55 | 3 |
| 49 | H | 1.5 | 4.0 | 130 | 55 | 5 |
| 50 | A | 1.5 | 2.5 | 100 | 15 | 1 |
| 51 | A | 2.5 | 2.5 | 100 | 6.9 | 1 |
| 52 | A | 2.5 | 3.3 | 100 | 11 | 1 |
| 53 | A | 2.5 | 4.2 | 100 | 7.7 | 1 |
| 54 | A | 2.5 | 5.5 | 100 | 4.8 | 1 |

The embodiments of the invention in which an exclusive property or privilege is claimed are defined as follows:

1. In the process for purifying polyoxyalkylene ether polyols containing residual catalyst impurities, said polyols having a molecular weight range of 300 to about 26,000, the improvement which comprises:
   1. providing a mixture of water, said polyol and an adsorbent consisting of synthetic magnesium silicate, wherein the amount of water is from about 1.0 to about 5.0 weight percent based on the weight of the polyol,
   2. heating said mixture at a temperature range from about 80° Centigrade to about 130° Centigrade, and
   3. separating the polyol from the water and the adsorbent by filtration wherein the residual catalyst impurities are retained in the adsorbent.

2. The process of claim 1 wherein the polyols are prepared by condensing ethylene oxide, propylene oxide, butylene oxide and mixtures thereof with active hydrogen compounds selected from the groups consisting of ethylene glycol, propylene glycol, water, dipropylene glycol, trimethylene glycol, butanediol, hexanetriol, glycerol, trimethylolpropane, trimethylolethane, hydroquinone, pentaerythritol, alpha-methylglucoside, sorbitol, sucrose, ethylene diamine, diethylene triamine, toluene diamine, aniline, methylene dianiline, piperazine, triisopropanolamine and bisphenol A.

3. The process of claim 1 wherein the water is added after the polyol and the adsorbent have been heat treated.

4. The process of claim 1 wherein the amount of adsorbent is from about 0.5 to about 5.0 weight percent based on the weight of the polyol.

5. The process of claim 1 wherein the amount of water is from about 2.0 to about 3.3 weight percent based on the weight of the polyol.

6. The process of claim 1 wherein the amount of adsorbent is from about 1.0 to about 3.0 weight percent based on the weight of the polyol.

7. The process of claim 1 wherein the mixture is heat treated from about 0.5 hour to about 5 hours.

* * * * *